United States Patent [19]
Day et al.

[11] 4,044,534
[45] Aug. 30, 1977

[54] LAWN MOWER

[76] Inventors: Stanley R. Day; Ray E. Day, both of 340 Lakeland, Grosse Pointe, Mich. 48230

[21] Appl. No.: 668,315

[22] Filed: Mar. 18, 1976

[51] Int. Cl.² ............... A01D 87/10; A01D 55/24
[52] U.S. Cl. ........................... 56/13.3; 56/244
[58] Field of Search ............... 56/12.7–13.4, 56/16.4, 16.6, 16.7, 244, 245, 290, 291, 292

[56] References Cited

U.S. PATENT DOCUMENTS

| 16,968 | 4/1857 | Comfort | 56/290 |
|---|---|---|---|
| 1,614,386 | 1/1927 | Peebles et al. | 56/13.4 |
| 1,721,355 | 7/1929 | Richards | 56/245 |
| 1,775,421 | 9/1930 | Clark | 56/244 |
| 2,026,291 | 12/1935 | Tirimacco | 56/13.3 |
| 2,319,425 | 5/1943 | Meitzner | 56/244 |
| 3,162,991 | 12/1964 | Maxant | 56/305 |
| 3,199,279 | 8/1965 | Yeske | 56/305 |
| 3,242,659 | 3/1966 | Dunlap | 56/17.4 |
| 3,783,592 | 1/1974 | Schraut | 56/13.3 |

*Primary Examiner*—Russell R. Kinsey
*Attorney, Agent, or Firm*—Whittemore, Hulbert & Belknap

[57] ABSTRACT

A lawn mower having an endless cutting band guided across a slotted cutter bar to cut grass projecting through the slots. Drive means moves the cutting band continuously in one direction.

4 Claims, 8 Drawing Figures

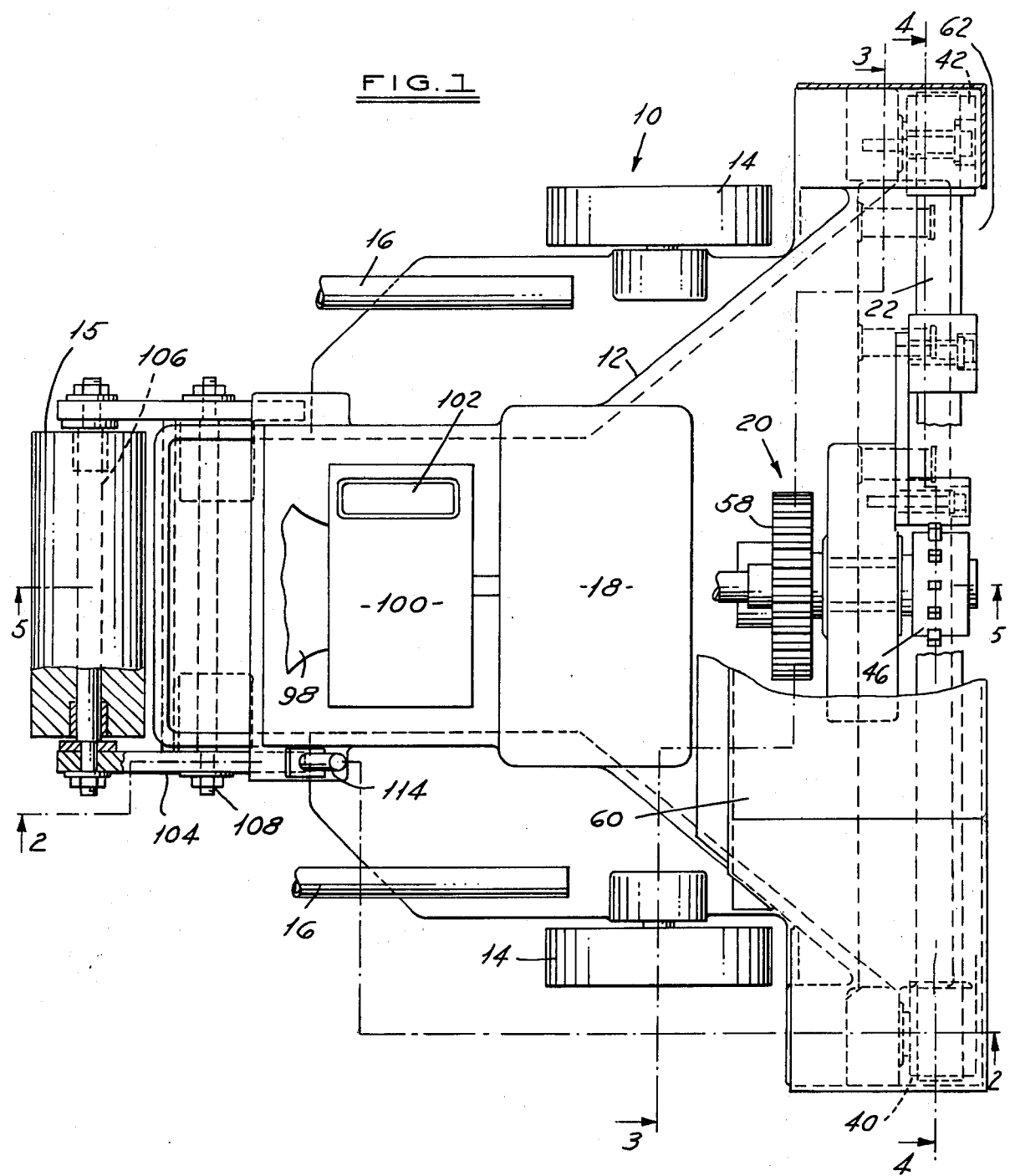

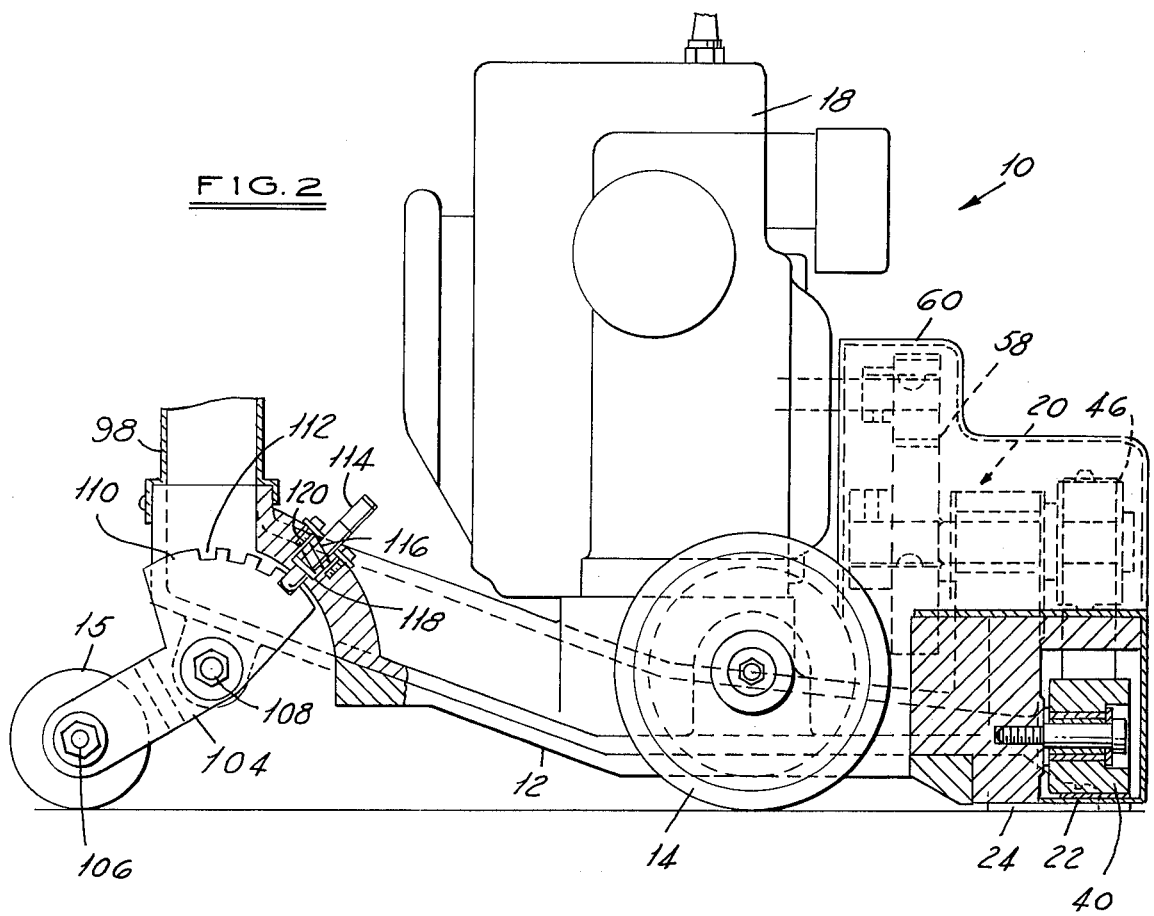
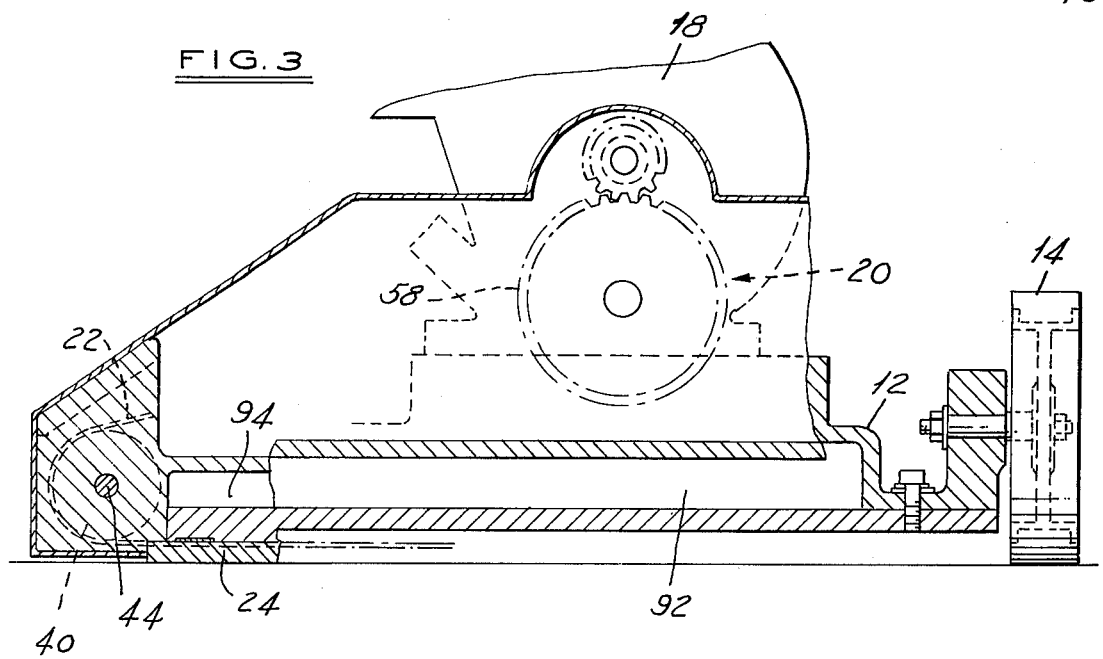

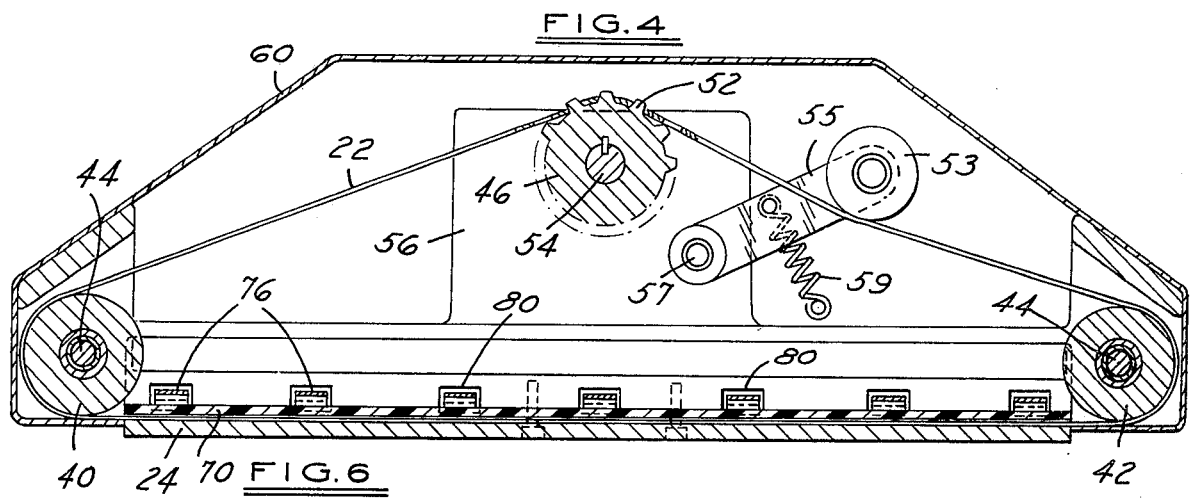
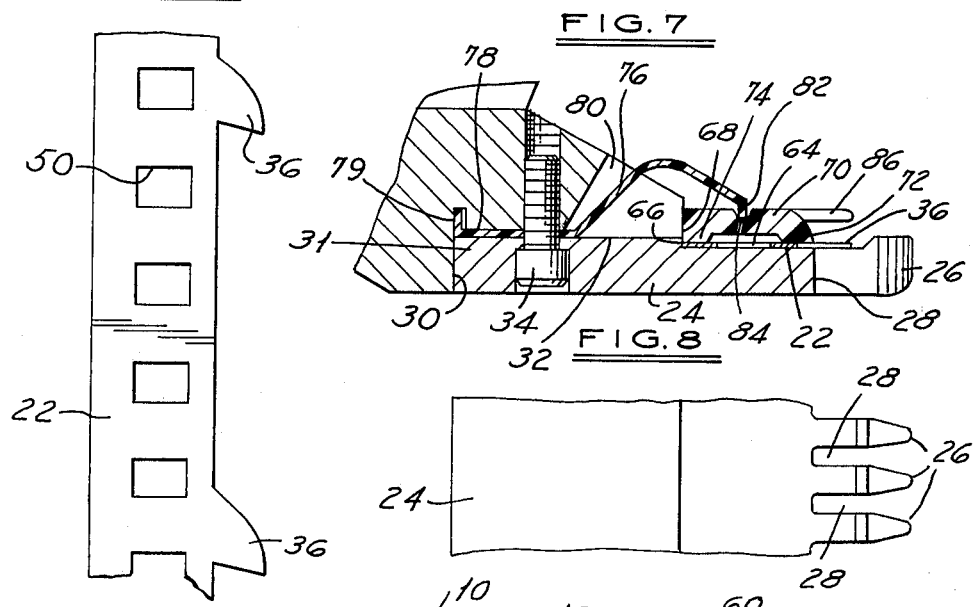
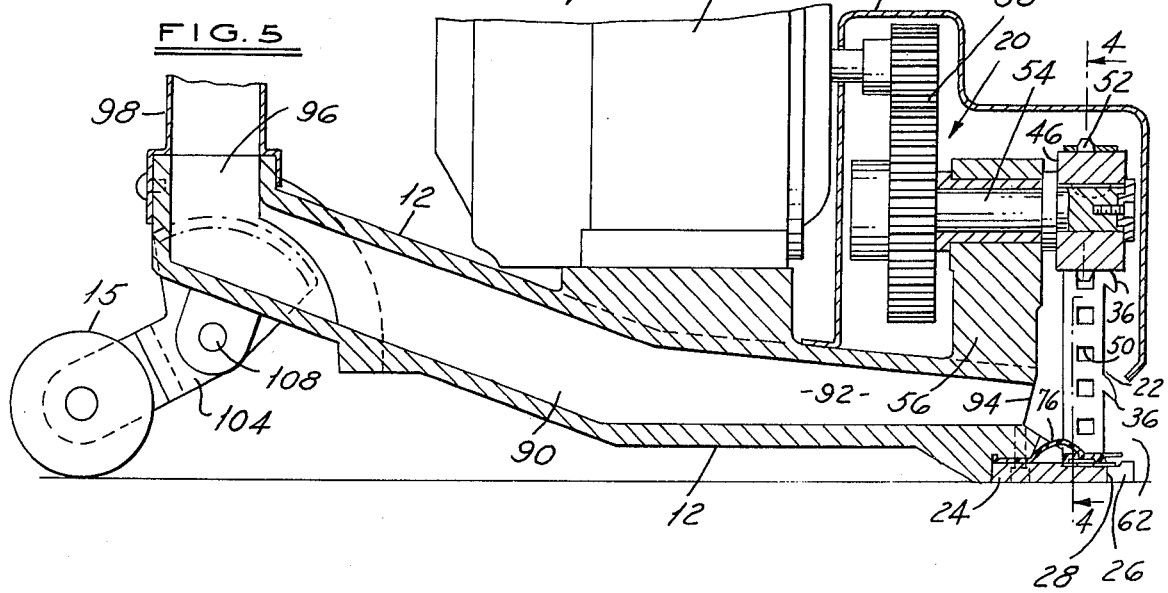

LAWN MOWER

BACKGROUND AND SUMMARY OF THE INVENTION

Present day lawn mowers generally are one of two types. The rotary has a blade or blades which rotate on a vertical axis to cut grass with a scythe or sickle action. The reel type has a reel provided with blades which rotates on a horizontal axis and cuts the grass against a cutter bar.

The lawn mower of the present invention is of still another type which is believed superior to either of the two now in use. In accordance with the present invention, the cutting action is performed by an endless band which is moved or orbited continuously in one direction across a slotted cutter bar. The cutter bar is disposed horizontally across the front of the lawn mower at an adjusted level near the ground. The cutting band has a bottom section which is guided across the top surface of the cutter bar and has teeth which sweep across the tops of the cutter bar slots to cut the grass projecting up through the slots. A smooth continuous cutting action is provided. There is continuous cutting of the grass along the length of the cutter bar without the pulses experienced with a reel type mower in which the blades make successive passes over the cutter bar. Thus my lawn mower is smoother in operation and cuts more uniformly.

Other objects and features of the invention will become more apparent as this description proceeds especially when taken in conjunction with the accompanying drawings wherein:

FIG. 1 is a top plan view with parts broken away and in section of a lawn mower constructed in accordance with my invention.

FIG. 2 is a sectional view taken on the line 2—2 in FIG. 1.

FIG. 3 is a sectional view taken on the line 3—3 in FIG. 1.

FIG. 4 is a sectional view taken on the line 4—4 in FIGS. 1 and 5.

FIG. 5 is a sectional view taken on the line 5—5 in FIG. 1.

FIG. 6 is a fragmentary plan view showing a portion of the cutting band.

FIG. 7 is an enlarged fragmentary sectional view of a portion of FIG. 5.

FIG. 8 is a fragmentary plan view showing a portion of the cutter bar.

Referring now more particularly to the drawings, the lawn mower is generally designated 10 and comprises a frame 12 supported for movement over the ground by the wheels 14 and rear roller 15. The wheels 14 are journaled to the housing 12 near to but spaced from the front of the housing on opposite sides thereof and the roller 15 is adjustably connected to the rear of the frame. A handle structure 16 is provided to guide or push the lawn mower over the ground. The lawn mower also includes a motor 18, transmission 20, cutting band 22 and cutter bar 24.

The cutter bar 14 is secured to the front of the frame 12 so as to extend substantially at right angles to the longitudinal center line of the frame and to be disposed in horizontal position near the ground when the lawn mower is supported on the ground by its wheels 14 and roller 15. The cutter bar 24 is an elongated member having along its front edge a plurality of laterally spaced forwardly projecting fingers 26 defining slots 28 between the fingers. The front portion of the frame 12 has a transverse recess in its underside to receive the cutter bar 24, the recess being defined by the vertical forwardly facing transverse surface 30 and the horizontal downwardly facing surface 32. The cutter bar has a mounting portion 31, the rear and top surfaces of which are held in contact with these frame surfaces 30 and 32 as seen in FIG. 7 by a plurality of bolts 34.

The cutting band 22 is an endless flexible band preferably of metal having a plurality of equally spaced forwardly projecting cutting teeth 36 along its front edge. The cutting band 22 is guided by idlers 40 and 42 so that its lower section moves across the top surface of the cutter bar. The idlers 40 and 42 are located at opposite ends of the cutter bar and are supported for free rotation on the frame of the machine by horizontal spindles 34 which project forwardly from the machine frame. The cutting band 22 extends over the idlers 40 and 42 and also over the sprocket 46. The cutting band has throughout its entire length a row of equally spaced apertures 50 to receive the teeth 52 on the sprocket in order to be driven by the sprocket. The cutting band 22 is supported by the idlers 40 and 42 and sprocket 46 in a vertical plane at right angles to the longitudinal center line of the mower. The sprocket is part of the transmission 20 and is mounted on a forwardly projecting horizontal shaft 54 which is journaled in a portion 56 of the frame 12. The shaft 54 in turn is driven by the motor 18 through the gearing 58. A housing 60 on the machine substantially encloses the transmission 20 and cutting band 22 is open at the front where indicated at 62 in the region where the cutting action takes place.

A tensioning roller 53 is provided to bear upon the cutting band between the sprocket 46 and one of the idles to remove slack. The roller 53 is mounted on an arm 55 pivoted to the frame at 57. The arm is urged in a crosswise direction in FIG. 4 by a coil spring 59 connected to the arm and to the frame to press the roller 53 against the cutting band.

The forwardly projecting portion of the cutter bar, that is the portion forwardly of its mounting portion 31, has a top surface 64 which provides a horizontal table for supporting the lower section of the cutting band between idlers 40 and 42. This table 64 is of somewhat reduced height to provide a vertical shoulder 66 which extends lengthwise of the cutter bar and throughout its length is flush and contiguous with the vertical front edge or nose 68 of the frame. The lower section of the cutting band 22 which slides on the table 64 has its rear edge in engagement with the shoulder 66. The teeth 36 projecting forwardly from the front edge of the cutting band sweep over the slots 28 in the cutter bar.

The cutting band 22 is held down upon the table 64 under a light pressure by the hold-down member 70. The hold-down member 70 is an elongated bar-like member of plastic for example which is parallel to and substantially co-extensive with the cutter bar. It is as seen in FIG. 7 of generally inverted U shape in cross section having the front and rear legs 72 and 74 which have limited engagement with the top surface of the cutting band on opposite sides of the row of apertures 50. This limited surface engagement is sufficient to hold the band down on the table 64 of the cutter bar but not enough to produce a significant drag on the continuous movement of the cutting band over the table 64.

The hold-down member 70 is yieldably held in light pressure engagement with the top surface of the cutting band by a plurality of leaf springs 76. The leaf springs are arranged in equal laterally spaced relation along the length of the cutter bar 24. The rear end portions of the leaf springs are disposed in recesses 78 in the surface 32 of the frame 12 which recesses are of a width substantially equal to the width of the springs to prevent them from shifting laterally and of a depth substantially equal to the thickness of the springs. These springs are clamped into the recesses 78 between the surface 32 of the frame and the mounting portion 31 of the cutter bar as seen in FIG. 7, the bolts 24 extending through apertures in the springs and providing a common means for holding both the cutter bar and the springs against displacement. The springs 76 being of a thickness equal to the depth of the recesses 78 are held tightly clamped by the cutter bar but do not interfere with the full surface-to-surface seating contact of the cutter bar mounting portion 31 and the frame surface 32. The springs have flanges 79 on their rear ends received in complementary slots in the frame to hold the springs from movement fore and aft.

The forwardly projecting portion of the frame is cut out or notched at spaced points where indicated at 80 in FIG. 7 to clear the springs which extend forwardly and terminate at their front ends in downturned flanges 82 that extend into a longitudinally extending central groove or recess 84 in the top surface of the hold-down member 70. These springs 78 apply a yielding downward pressure upon the hold-down member 70 so as to cause the hold-down member to floatingly engage under a predetermined yielding pressure with the top surface of the cutting band 22, holding it down on the table 64 of the cutter bar but not producing any significant drag on its continuous movement.

It will be noted that the springs 76 hold the rear surface of the hold-down member 70 in engagement with both the shoulder 66 of the cutter bar and the nose 68 on the frame for locating purposes. The springs 76 are the sole retaining means for the hold-down member. The hold-down member may be removed by manually flexing the springs upwardly.

The hold-down member is formed wth a series of longitudinally spaced forwardly projecting fingers 86 which are spaced apart the same distance as and overlie the teeth 26 of the cutter bar and are disposed above the traveling teeth 36 of the cutting band. These fingers 86 serve as a guard to prevent injury to the hands and feet of an operator of the mower.

The frame 12 has a tunnel 90 formed with a flaring inlet 92 at the forward end which opens through the front of the frame where indicated at 94 above and slightly to the rear of the cutter bar 24. The rear end 96 of the tunnel communicates with the intake passage 98 of a blower 100. The blower is operated by the motor 18 to draw air and grass cuttings through the tunnel 90 and to expel the same through the blower outlet 102.

A pair of arms 104 rotatably support the axle 106 of the roller 15. The arms 104 are pivoted to the frame on aligned axes at 108. One arm has an arcuate segments 100 provided with spaced notches 112 in its periphery. A plunger 114 mounted for axial sliding movement on the frame is forced by the pressure of spring 116 to an extended position determined by the engagement of its flange 118 with the bottom of the passage 120 in which the plunger slides. In the extended position, the plunger nose projects into one of the notches 112 to fix the setting of the roller 15. The plunger may be withdrawn against the spring pressure by hand to remove the nose from the notch and allow the roller to be adjusted up or down. As will be clear from FIG. 2, upward adjustment of roller 15 will lower cutter bar 24, and vice versa. The mower can be adjusted in this manner to control the height of the cutting action.

In use, the mower is hand pushed, or of course it could be power driven, over the ground with the cutting band driven continuously in one direction by motor 18 causing the cutter band 22 to move over table 64 and the teeth 36 to sweep across the tops of the cutter bar slots 28 and cut the grass projecting above the slots. The grass of course enters the slots through the open front 62 and the open spaces between the cutter bar teeth 26 as the lawn mower is pushed in a forward direction. The protective fingers 86 on the hold-down member 70 do not interfere with the grass because they are in register with the cutter bar fingers 26. The grass cuttings are drawn through the tunnel 90 and discharged by the blower 100.

What I claim as my invention is:

1. A lawn mower comprising a frame supported on wheels for movement over the ground, an elongated slotted cutter bar mounted on said frame extending horizontally in a position close to the ground when said frame is supported on said ground by said wheels as aforesaid, an endless cutting band, means on said frame for guiding said cutting band for movement across the slots of said cutter bar to cut grass projecting through said slots, drive means for moving said band continuously in one direction, said guide means including a hold-down member for holding said cutting band down against the top surface of said cutter bar, spring means for pressing down resiliently on said hold-down member, said slots in said cutter bar being formed between forwardly projecting teeth along the front edge of said cutter bar, said band having forwardly projecting cutting elements which pass over said slots, and said hold-down member having forwardly projecting fingers above said cutting elements and in register with said cutter bar teeth.

2. The lawn mower defined in claim 1, wherein said hold-down member is substantially coextensive with said cutter bar and has a groove in its top surface, said spring means comprising individual springs the ends of which engage said groove, said springs providing the sole means of retaining said hold-down member in place.

3. The lawn mower defined in claim 2, wherein common means are provided for securing said cutter bar and said springs to said frame, said frame having recessed portions receiving said springs to retain them against shifting.

4. The lawn mower defined in claim 2, including means providing a duct having one end adjacent said cutter bar, and a blower for drawing grass cuttings through said duct and discharging the same.

* * * * *